United States Patent [19]

Schleifenbaum et al.

[11] 3,962,940
[45] June 15, 1976

[54] APPARATUS FOR METERING COPY MATERIAL IN BLUEPRINT MACHINES

[75] Inventors: Karl Schleifenbaum, Haiger; Werner Schweisfurth, Siegen, both of Germany

[73] Assignee: Meteor-Siegen Apparatebau Paul Schmeck GmbH, Siegen, Germany

[22] Filed: Sept. 10, 1974

[21] Appl. No.: 504,834

[30] Foreign Application Priority Data

Sept. 10, 1973 Germany............................ 2345538

[52] U.S. Cl.................................. 83/208; 83/241; 83/289; 83/365; 83/369
[51] Int. Cl.² ...................... B26D 5/34; B26D 5/00
[58] Field of Search ............. 83/365, 289, 208, 241, 83/369

[56] References Cited
UNITED STATES PATENTS 3,351,740  11/1967  Heuer............................... 83/365 X
3,513,741  5/1970  Shallenberg....................... 83/369 X
3,797,346  3/1974  Kakii et al. ....................... 83/365 X Primary Examiner—Willie G. Abercrombie
Attorney, Agent, or Firm—Olson, Trexler, Wolters, Bushnell & Fosse, Ltd.

[57] ABSTRACT

Apparatus for controlling cut-off of paper from a web thereof fed through a blue print machine or the like, includes a main shaft driven by the drive structure of such machine, a threaded sleeve is mounted on said main shaft and is resiliently restrained against rotation. A plier-like pair of jaws is received in the threads of said sleeve for displacing said sleeve axially when it is clutched to said main shaft by an electromagnetic clutch. Holes are provided in said sleeve which are detected optically to operate in the generation of a control signal to effect cutting of said web.

7 Claims, 3 Drawing Figures

APPARATUS FOR METERING COPY MATERIAL IN BLUEPRINT MACHINES

The invention relates to an apparatus for metering pre-determined, especially standardized lengths of web-like copy material in blueprint machines, in function of patterns with variable lengths, with feed rolls for the pattern and the copy material, and a cutting installation for separating the copy material.

Modern blueprint automats process in an increasing extent copy material from supply coils. Thus, it is necessary to separate the copy material in the length required in the individual case, in function of the length of the pattern from which a print is made.

It is known to scan the rear edge of the pattern passing through the blueprint machine and to operate the cutting installation in function thereof, so that the cut-off copy material sheet has the same length as the pattern. problems arise when the pattern has no standard dimension length so that the blueprint made from it has no standard dimensions. In many cases it is appropriate or even necessary to obtain a blueprint with standard dimensions, regardless of the size of the pattern, because only it can be folded or stored otherwise according to standard scheme.

Thus, the problem of the invention is based on making possible the copying of patterns with non-standard outer dimensions on standard format copy material even when the copy material needed is cut from a supply coil in function of the pattern length.

Starting from the metering apparatus initially indicated, the invention solves this problem by a threaded bushing propelled synchronously with a feed roller, a scanner moving in the thread of this bushing during the rotation of the feed roller, and longitudinally displacing the threaded bushing and bearing contact means coacting with a scanner actuating the cutting installation. The length of the thread pitch on the threaded bushing represents thereby the length of the copy material moved in each case already and by arranging the contact means at certain points corresponding to certain standard format dimensions of the threaded pitch it is possible to make sure that only standard lengths of copy material are cut from the supply roll; naturally the contact means only connect all the way through to the cutting system when the usual scanner scanning the end of the pattern has reported that the pattern has passed all the way through.

With the aid of the threaded bushing (which need not necessarily be a "bushing" in the strict meaning of the word, the thread being decisive) it is possible to also meter larger pattern and copy material lengths with high precision, without requiring a major space in the machine. The metering system according to the invention moreover makes it possible to effect certain corrections in the length of copy material aginast the pattern length without difficulties: for example, so-called "suspension strips" of patterns which shall not appear on the copies, can be bridged by corresponding delay of the start of the metering against the infeed of the pattern scanning, in a manner of speaking, so that the contact means release a contact effectively on the threaded bushing, which are part of the actual drawing format, for effecting the separating process by the cutting system, although the pattern including the suspension strips is longer than that format.

Because after each metering and cutting operation the scanner must return to its starting position on the threaded bushing, it is provided preferably that the scanner is tongue-shaped in design and provided with two levers pivotable about an axis parallel with the axis of the threaded bushing, said levers being pretensioned in the closing direction against the threaded bushing, thereby engaging with guide shoes at their free ends into the thread, but they can be opened against the bias force, whereby the guide shoes move out of the thread and the threaded bushing returns to its starting position because of a longitudinal pretension. As soon as the contact means on the threaded bushing have effectively released a cutting operation (because the scanner scanning the end of the pattern has reported its complete passage therethrough), the metering apparatus according to the invention returns that way into its starting position. In spite of great lengths of the patterns and the metering path travelled on the threaded bushing, the metering apparatus is ready upon completion of one metering operation, within the shortest possible time, for another metering operation, and the distance to the next pattern may be relatively small.

Because for an exact measuring of the length it is important for the drive of the threaded bushing to start again and again from the same location, it is advantageous to provide for an orientation system which pretensions the threaded bushing into a defined rotary position.

The contact means may consist for example of cutouts in the threaded bushing and a light barrier responding to it placed stationarily in relation to the scanner. To be able to effect a fine adjustment in this respect the angle positions of the effective cutout apertures are preferably adjustable.

The drawing exemplifies an embodiment of the invention.

Figure 1:
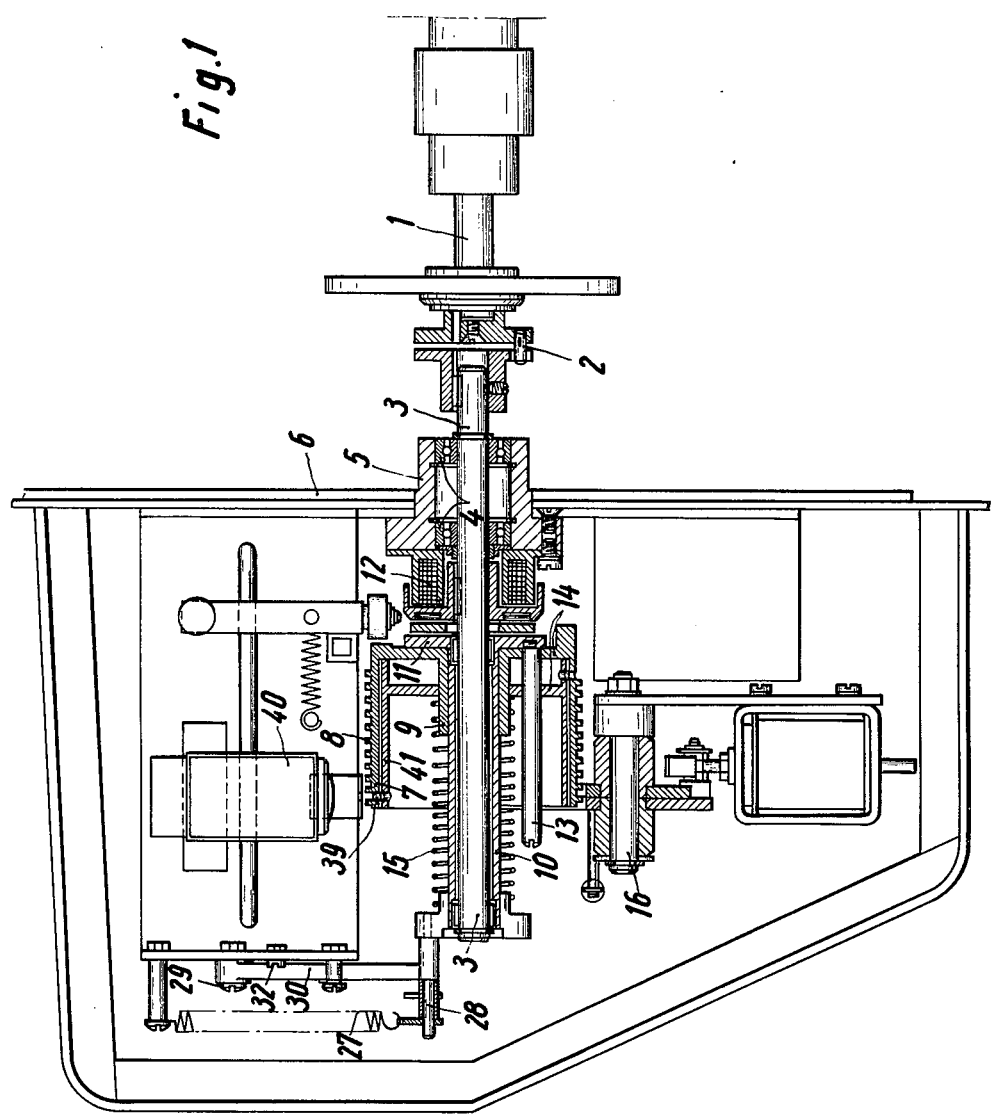
FIG. 1 shows a vertical section through this embodiment.

The shaft 1 is part of the main drive of the blueprint machine (the remainder of which is not shown); this main drive is coupled selectively to one of several copy material pattern rolls and to the copy material feed formed by several pairs of feed rolls. The shaft 1 propels via a pin clutch 2 the main shaft 3 of the metering apparatus which is positioned suspended by ball bearings 4 in a bushing 5 which in turn is fastened to an intermediate wall 6 of the blueprint machine housing.

A threaded bushing 7 is positioned on the shaft 3 rotatably and longitudinally displaceably. It is provided with an outer thread 8 and has a concentrical inner bushing 9 sliding on a casing 10 surrounding the shaft 3. The casing 10 has at its right end in FIG. 1 a frontal flange 11 which can be coupled with the aid of a magnetic clutch 12 to the shaft 3, so that the casing 10, in which shaft 3 normally rotates freely, then rotates with the shaft 3. A pin 13 is fastened at the flange 11 axis parallel with the shaft 3, passing as an entrainment pin the radial walls 14 of the threaded bushing 7; it assures that the threaded bushing 7 always rotates with the casing 10, but can move relatively to it axially. A relatively weak pressure spring 15 surrounding casing 10 and anchored at its free end urges the threaded bushing 7 in rest position (to the right in FIG. 1) to adhere at the flange 11 of the casing 10.

The scanner identified in its entirety with 17 is positioned on another pin 16 positioned axis parallel to the shaft 3, but stationarily. It consists of two jaws 18, 19 formed and arranged pincer-like, with guide shoes 20 fastened to their free ends which engage into the thread 8 on the threaded bushing 7. A traction spring 21 tensions the jaws 18, 19 on each other, but their force can be overcome by the piston 22 of an electro magnet 23 which upon actuation of the electro magnet engages at extensions 24, 25 of the levers 18 and/or 19 and pivots them so far about the pin 16 that the guide shoes 20 move out of the thread 8 of the threaded bushing 7.

An orientation system identified as a whole by 26 assures that the threaded bushing 7 always occupies the same defined starting position at the beginning of a metering operation. A traction spring 27 which is anchored stationarily is suspended with its other end at a pin 28 mounted crank-like and eccentrically at the casing 10. As the casing 10 (and the threaded bushing 7) are propelled, the force of the spring 27 is overcome cyclically, but as soon as the propulsion stops, because clutch 12 is opened, the spring 27 pulls the casing 10 and with it the threaded bushing 7 into the rest position shown in FIGS 1 and 2. Because the spring 27 can adjust the "zenith" position of the pin 28 to the shaft 3 only approximately, the fine adjustment of the pin 28 (and thus of the threaded bushing 7) is carried out in the following manner: a plate 30 pivotably suspended at a pin 29 can execute in the direction of the arrow 31 (FIG. 2) pivotal movements from the rest position shown in FIG. 2 (corresponding to the defined starting position of the threaded bushing 7), the stop 32 adjustable for adjustment purposes prevents a pivoting movement in the opposite direction. The plate 30 is pulled against this stop by a stationarily anchored spring 33. This adjustment force is transmitted from the plate 30 to the pin 28 by a jaw 34 of a latch 35 which (in FIG. 2) can pivot away upwardly when following the disengagement of the clutch 12 the pin 28 is pulled by the spring 27 into its "zenith position" in clockwise direction; as soon as this has occurred, the jaw 34 of the latch 35 which is snapped backward prevents an accidental counter-movement of the pin (28) (in counter-clockwise direction). However, in operation with clutch 12 engaged, when the casing 10 and with it the pin 28 will rotate counter-clockwise according to the arrow 36, the drive force overcomes the force of the spring 33 when the pin 28 presses against the jaw 34 of the latch 35, so that the plate 30 bearing the latch 35 is pivoted in the direction of the arrow 31 and returned, as soon as the pin 28 is disengaged from the latch 35 with the jaw 34.

While the latch 35 secures the starting position of the pin 28 and thus of the threaded bushing 7 toward one side, a latch 37 with jaw 38 does this job toward the other side, and it likewise is positioned pivotably on the plate 30. During the propulsion of the casing 10 and thus the pin 28 in clockwise direction, the pin 28 presses the latch 37 upward upon passage. As soon as pin 28 has passed, the latch 37 drops down again and the jaw 38 forms a defined stop for the pin 28. The precise position of the jaw 38 is determined via the plate 30 through the stop 32.

Perforations 39 are provided at the bottom of the thread 8 of the threaded bushing 7 at various points which can be determined by the desired lengths of copy material. They coact with a light barrier cell 40 which furnishes a signal as soon as the light beam emitted by it is no longer relfected by the threaded bushing, but passes through a perforation 39. The effective control edges of the perforations 39 can be adjusted precisely by means of a focus 41 inside the threaded bushing 7.

The metering apparatus operates in the following manner: as soon as upon the introduction of a pattern into the blueprint machine the scanner scanning its anterior edge issues a signal the conveying of copy material is started in the usual manner by operation of the associated clutches. At the same time the magnetic clutch 12 is energized, so that the rotary movement of the shaft 3 is transmitted to the casing 10. The entrainment pin 13 allows the threaded bushing 7 to rotate with the casing, and since the guide shoes at the levers 18, 19 are pulled by the spring 21 into the pitch groove of the thread 8 the threaded bushing 7 is threaded between the guide shoes 20 in a forward direction, that is to say it displaces axially on the casing 10 against the force of the spring 15 (to the left in FIG. 1). Due to the effect of transmission of the threaded bushing, its speed may be quite high, so that the above mentioned dissolution and thus precision of the longitudinal dimension will result, yet even at large lengths to be metered, the threaded bushing would not become excessively large.

When copying a relatively large size pattern several perforations 39 pass the contact beam of the light barrier cell 40, but the impulse thereby released will not put the cutting installation into operation because at this moment the rear edge scanner has not yet reported passage of the rear edge of the pattern. Only thereby can the impulse released by the cell 40 become effective at the cutting system. As soon as that scanning signal comes to pass the through switching path is opened between cell 40 and the cutting system and it is maintained open, so that the next cutting impulse which occurs upon passage of the next perforation 39 through the measuring beam of the light barrier cell 40, will release the cutting system. By so adjusting the rear edge scanner that in feed direction of the pattern it is placed backward, the switching path also can be opened for copy material format corresponding to a certain drawing format to a cutting impulse by the metering system (cell 40), if the pattern is actually longer than the standard format for example due to a suspension strip or the like.

Figure 2:
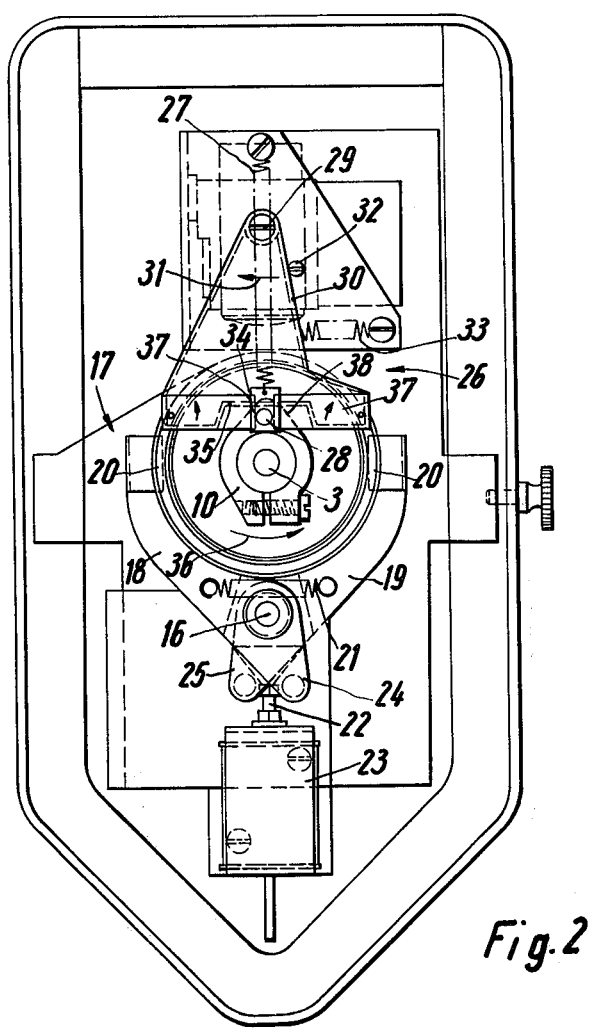
FIG. 2 shows a front view.
Figure 3:
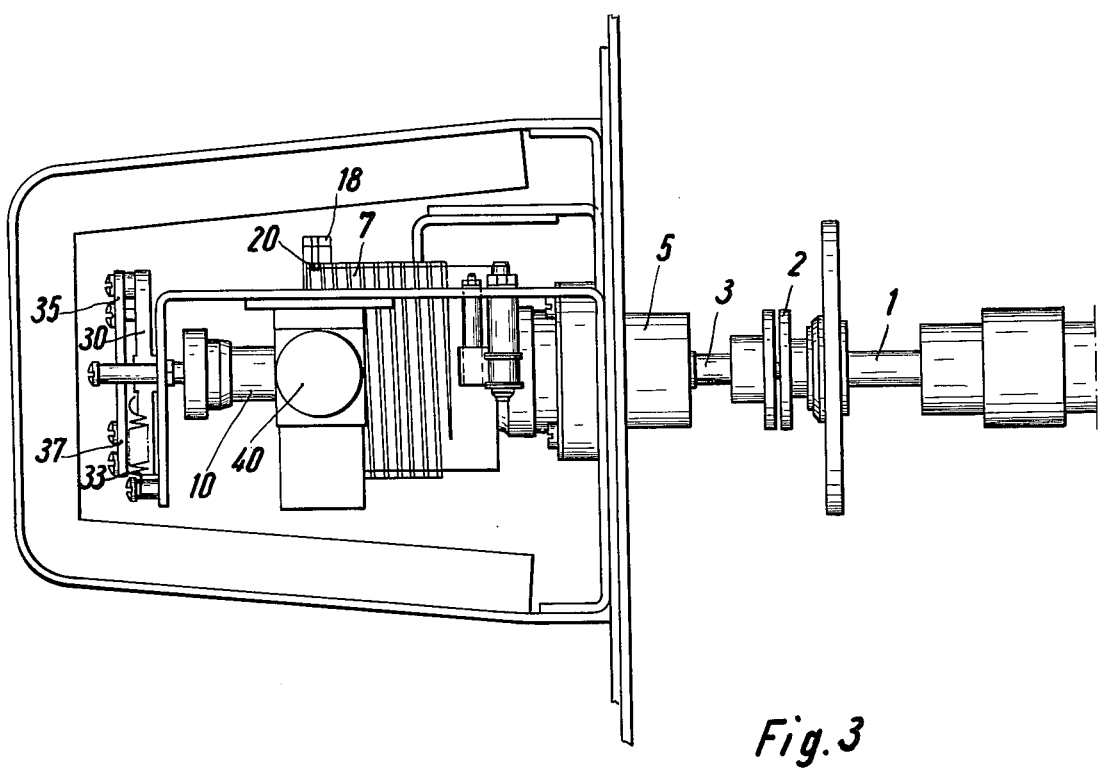
FIG. 3 shows a view from the top.

At each revolution of the bushing 10 the spring 27 is once tensioned and then again relaxed to a large extent. Moreover, with each passage (in the direction of the arrow 36) the latch 37 is once lifted and the plate 30 is pivoted (in the direction of the arrow 31) (FIG. 2). As soon as a cutting impulse emitted by the cell 40 can become effective, the clutch 12 is deenergized also together with the clutches for the copy material feed rolls, and thus the drive connection between shaft 3 and casing 10 is severed. At the same time the magnet 23 is energized for a short period, and it spreads via the piston 27 and the extensions 24, 25, the plier levers 18, 19, so that the guide shoes 20 move out of the pitch of the threaded bushing 7. Thus, on the one hand, the spring 15 can push the bushing 7 back to the flange 11 (FIG. 1), on the other hand, the spring 27 can so turn the casing 10 that the pin 28 assumes with reference to the axis of the shaft 3 its "zenith position". Thereby the pin 28 is "trapped" between the jaws 34 and 38 of the latches 35, 37 and maintained in its defined position by springs and stops in the above described manner. The metering apparatus then is ready for a new operation.

What we claim is:

1. In a blueprint machine or the like, apparatus for metering copy material, particularly standard length, from a web of copy material fed through said machine, the original material to be copied in said machine being of variable length, said apparatus having a main shaft driven by a shaft forming a part of the main drive of said machine, a threaded sleeve having a rest position, clutch means inter-connecting said main shaft and said threaded sleeve and driving said sleeve in synchronism with said main shaft when said clutch is engaged, follower means received in the threads of said sleeve and displacing said sleeve axially from said rest positin upon driving of said sleeve by said clutch, and means coacting with said sleeve for generating a signal upon predetermined displacement of said sleeve for controlling severing of said copy material.

2. Apparatus as set forth in claim 1, wherein said sleeve is co-axial with and is mounted on said main shaft.

3. Apparatus as set forth in claim 1, wherein said follower means comprises a pair of opposed jaws, means for retracting said jaws from the threads of said sleeve, and means effective upon such retracting to return said sleeve to rest position.

4. Apparatus as set forth in claim 3, wherein said jaws are of a plier-like construction, including two levers.

5. Apparatus as set forth in claim 1, and further comprising means including spring means for restraining said sleeve against rotation about its own axis.

6. Apparatus as set forth in claim 1, wherein said sleeve is provided with holes therein and said co-acting means include optical means for sensing the position of said holes.

7. Apparatus as set forth in claim 6, and further including a shield in said sleeve for adjusting the effective position of said holes relative to said co-acting means.

\* \* \* \* \*